United States Patent
Bishop, III et al.

(10) Patent No.: US 9,798,884 B1
(45) Date of Patent: Oct. 24, 2017

(54) SYSTEMS AND METHODS FOR IDENTIFYING INSIDER THREATS IN CODE

(71) Applicant: Veracode, Inc., Burlington, MA (US)

(72) Inventors: Jack L. Bishop, III, Evanston, IL (US); Jason D. Montgomery, Columbus, OH (US); Kelley S. Campbell, Chapel Hill, NC (US); Dennis Mederios, Burlington, MA (US)

(73) Assignee: Veracode, Inc., Burlington, MA (US)

(*) Notice: Subject to any disclaimer, the term of this patent is extended or adjusted under 35 U.S.C. 154(b) by 0 days.

(21) Appl. No.: 15/290,656

(22) Filed: Oct. 11, 2016

(51) Int. Cl.
*G06F 21/57* (2013.01)
*G06F 21/56* (2013.01)
*G06N 99/00* (2010.01)

(52) U.S. Cl.
CPC .......... *G06F 21/577* (2013.01); *G06F 21/563* (2013.01); *G06F 21/566* (2013.01); *G06N 99/005* (2013.01); *G06F 2221/033* (2013.01)

(58) Field of Classification Search
CPC .... G06F 21/577; G06F 21/563; G06F 21/566; G06F 2221/003; G06F 2221/033; G06N 99/005
See application file for complete search history.

(56) References Cited

U.S. PATENT DOCUMENTS

| | | | | |
|---|---|---|---|---|
| 8,201,257 B1* | 6/2012 | Andres | .................... | G06F 21/56 726/23 |
| 8,527,955 B2* | 9/2013 | Baker | ................. | G06F 11/3604 714/38.1 |
| 8,789,192 B2* | 7/2014 | LaBumbard | .......... | G06F 21/577 726/25 |
| 9,268,674 B1* | 2/2016 | Ben-Cnaan | ......... | G06F 11/3688 |
| 2004/0205727 A1* | 10/2004 | Sit | ....................... | G06F 11/3664 717/125 |
| 2010/0024035 A1* | 1/2010 | Wallace | ................ | G06F 21/554 726/25 |
| 2011/0067005 A1* | 3/2011 | Bassin | .................. | G06F 11/008 717/127 |
| 2011/0173693 A1* | 7/2011 | Wysopal | ............. | G06F 11/3612 726/19 |
| 2013/0047140 A1* | 2/2013 | Shann | ................. | G06F 11/3664 717/128 |
| 2014/0137257 A1* | 5/2014 | Martinez | ............. | H04L 63/1433 726/25 |

(Continued)

OTHER PUBLICATIONS

Thakur et al., "Analyze-NOW An Environment for Collection & Analysis of Failures in a Network of Workstations", Dec. 1996, IEEE Transactions on Reliability, vol. 45, No. 4, pp. 561-570.*

(Continued)

*Primary Examiner* — Matthew Smithers
(74) *Attorney, Agent, or Firm* — Goodwin Procter LLP (57) ABSTRACT

In a system for detecting composite vulnerabilities associated with a process or a context, individual defects/vulnerabilities in a software system/application are identified and clustered into two or more classes of defects, where each class includes one or more defects of related types. Given a pattern of defects of different types, where the pattern represents a composite vulnerability, it is determined by searching in the clusters, if the software system/application includes all of the defects/vulnerabilities associated with that pattern.

30 Claims, 2 Drawing Sheets

(56) References Cited

U.S. PATENT DOCUMENTS

2014/0165204 A1* 6/2014 Williams .............. G06F 21/55
  726/25
2015/0095876 A1* 4/2015 Novak ................ G06Q 10/101
  717/102
2015/0278526 A1* 10/2015 Bhattacharya ........ G06F 21/577
  726/1

OTHER PUBLICATIONS

Chang et al., "Discovering Neglected Conditions in Software by Mining Dependence Graphs", Sep. 2008, IEEE Transactions on Software Engineering, vol. 34, No. 5, pp. 579-596.*

* cited by examiner

SYSTEMS AND METHODS FOR IDENTIFYING INSIDER THREATS IN CODE

FIELD OF THE INVENTION

This disclosure generally relates to vulnerability assessment of computer systems and, more particularly, to systems and methods for identifying vulnerabilities that are based on several individual but related vulnerabilities.

BACKGROUND OF THE INVENTION

Software applications typically include flaws or defects, causing the software to operate in an unintended or undesired manner. The flaws/defects in the code are often introduced inadvertently. For example, a flaw may be introduced due to a programming error, or because the code developer failed to comply with a recommended coding practice. Sometimes, however, a flaw/defect may be introduced purposefully. Regardless of how (i.e., unintentionally or purposefully) or why a defect is introduced, a defect can be exploited to gain unauthorized access to the software, control the behavior of the software, and/or to access data associated with the software.

Static and dynamic vulnerability analysis techniques that can analyze the source code and/or one or more compiled binary files corresponding to a software application can be used to detect such vulnerabilities. A static analyzer that can analyze one or more compiled binary files corresponding to a software application is useful at least in situations where the source code is unavailable for a number of reasons, e.g., when the owner of the source code wishes not to disclose the source code to the tester performing the static analysis, when a portion of the binary files is obtained from a third party and the corresponding source code is not available from the third party, etc.

Dynamic analysis typically involves at least a partial execution of one or more binary files (also called binaries), and can detect flaws in the code by analyzing results produced by the software in response to one or more stimuli or inputs. As used herein, binary files are not limited to machine code only and may include files that are derived by processing source code and that include representations that are not source code representations, such as byte code, object code, intermediate representation, etc., where these representations are dependent on the respective programming languages used.

Large software systems often include dozens, hundreds, thousands, hundreds of thousands, or even more defects. The static and dynamic analyzers can identify many of these defects, but remedying each and every one of them can be costly and/or time consuming, and may be impractical in some situations. Not all defects, however, are equally critical or are even important. For example, some defects may not render data associated with the software vulnerable to unauthorized access, while some defects would. Some analysis techniques can rank the identified defects according to severity thereof and/or a danger posed thereby. Those defects that rank above a certain severity threshold may be analyzed/investigated further and/or remedied.

SUMMARY OF THE INVENTION

By analyzing many different software systems/applications and by analyzing the defects identified therein, it was discovered that a group of defects/vulnerabilities in a software system/application, where each defect/vulnerability individually may not represent a significant security threat, can create a substantial vulnerability in the software. Such a composite vulnerability, that incorporates two or more vulnerabilities/defects may have been purposefully introduced by an insider such as a code developer or a group of code developers. Each individual vulnerability, that is part of a composite vulnerability, even if detected by a static and/or dynamic analyzer, may not be identified as a serious issue or vulnerability, and may be determined to be a coding error, less than perfect adherence to a recommended coding practice, etc. As such, these individual vulnerabilities may not be remedied, and may be exploited to cause harm to the software and/or to provide unauthorized access to data processed by the software and/or other software systems.

In various embodiments, systems and methods described herein can detect such composite vulnerabilities. This is achieved, at least in part, by identifying patterns of different kinds of individual vulnerabilities associated with typical composite vulnerabilities. For example, a composite vulnerability providing unauthorized access to data may include a trigger event, allowing a malicious entity (e.g., a person or a malicious program) to gain control of the software. In addition, the composite vulnerability may also include reading and transmitting data from the software and/or deleting, corrupting, and/or replacing the existing data. In some cases, the composite vulnerability may include yet another defect, e.g., code obfuscation, to minimize the risk of detection of the purposefully introduced defect that transmits and/or modified software data.

After various defects/vulnerabilities in the software are identified via static and/or dynamic analysis, these defects/vulnerabilities are clustered according to their type. The clusters may then be searched to locate if a pattern corresponding to a significant composite vulnerability actually exists in the software, distributed across several clusters. If such a pattern is detected, it may be investigated whether those vulnerabilities are associated with a single developer or a group of developers. Such an association can suggest that these vulnerabilities are likely not due to coding errors or less than perfect coding practices, but may have been introduced intentionally. Even if such an association does not exist, another malicious entity may be able to take advantage of the fact that the combination of these individual vulnerabilities can be exploited for causing harm to the software and/or to access data without authorization. Therefore, if such a pattern is detected, the individual vulnerabilities therein may be investigated further and/or remedied, even if none of those defects/vulnerabilities is serious when taken individually and out of context. Robustness of the software to intentional or inadvertent weaknesses can thus be increased.

Accordingly, in one aspect, a method is provided for determining whether a composite security vulnerability based on a number of other vulnerabilities exists in a code. The method includes performing by a processor the steps of: (a) classifying a set of detected vulnerabilities associated with a code into a number of different classes, and (b) performing a first test to determine whether a first class includes a first individual vulnerability matching a first reference vulnerability in a specified group. The method also includes (c) performing a second test to determine whether a second class (different from the first class) includes a second individual vulnerability matching a second, different reference vulnerability in the specified group. The method also includes (d) identifying, based at least on results of the first and second tests, a composite security vulnerability that is based on the first and second individual vulnerabilities.

Step (a) generally starts with a set of vulnerabilities that is already determined to exist in a software application/system. These vulnerabilities are clustered or classified into two or more classes—such as event trigger, communication, covering tracks, etc. A rule is specified as a group of two or more reference vulnerabilities such as CWEs (e.g., {CWE_1, CWE_2}), where each reference vulnerability/CWE belongs to a different class. Step (b) checks if there is a vulnerability in the code that matches CWE_1 and Step (c) checks if there is a vulnerability in the code that matches CWE_2, which belongs to a different class from the class to which CWE_1 belongs. Step (d) determines that a security vulnerability exists that is based on both the vulnerability from the first class and the vulnerability from the second class. The number of reference vulnerabilities in the rule/group can be more than two and, correspondingly, there can be more than two classes.

In some embodiments, the first and/or the second reference vulnerabilities are represented using a format such as common weakness enumeration (CWE), SysAdmin, Audit, Network, Security (SANS) Institute software security and classification, Institute of Electrical and Electronics Engineers (IEEE) standard classification of software defects, or Open Web Application Security Project (OWASP) classification of defects. Identifying the composite security vulnerability includes determining that a code-development unit associated with the first individual vulnerability is also associated with the second individual vulnerability. A code-development unit can be a single developer, or the members of a team who, together, created the vulnerability, either intentionally or advertently.

In some embodiments, each vulnerability designated to the first class may include a vulnerability related to an event trigger, and each vulnerability designated to the second class may include a vulnerability that is not related to an event trigger. The first reference vulnerability may include one or more of: a vulnerability that includes a logic trigger based on a time comparison; a vulnerability causing process flow disruption in the flow; and a vulnerability allowing bypassing a password check. In some embodiments, each vulnerability designated to the first class includes a vulnerability related to data communication, and each vulnerability designated to the second class includes a vulnerability that is not related to data communication. The vulnerability related to data communication may include a data exfiltration vulnerability and/or a data injection vulnerability. The first reference vulnerability may include a vulnerability allowing credential insertion, and/or a vulnerability allowing creation of a communication channel based on of at least one of: (i) a telnet; (ii) a secure shell, and (iii) a socket.

In some embodiments, each vulnerability designated to the first class includes a vulnerability related to code obfuscation, and each vulnerability designated to the second class comprises a vulnerability that is not related to code obfuscation. The first reference vulnerability may include one or more of: a vulnerability comprising a plurality of string encodings; a vulnerability based on a difference between a time of check and a time of use; a vulnerability comprising at least one redundant check; a vulnerability comprising log forging; and a vulnerability comprising method overriding.

In some embodiments, the method further includes performing a third test to determine whether a third class includes a third individual vulnerability matching a third reference vulnerability in the specified group. In these embodiments, identifying the composite security vulnerability based on the first and second individual vulnerabilities includes identifying a composite security vulnerability that is also based on the third individual vulnerability. Each vulnerability designated to the first class may include a vulnerability related to a first type, each vulnerability designated to the second class may include a vulnerability related to a second type that is different from the first type, and each vulnerability designated to the third class may include a vulnerability related to a third type that is different from both the first type and the second type. Each of the first, second, and third types may include one of: (i) an event trigger; (ii) data communication; and (iii) code obfuscation.

In some embodiments, the method further includes employing machine learning to generate a derived group by identifying at least one of: (i) a derived first reference vulnerability corresponding to the first reference vulnerability, and (ii) a derived second reference vulnerability corresponding to the second reference vulnerability, and including the derived first reference vulnerability and/or the derived second reference vulnerability in the derived group. The method may also include performing steps (b)-(d) using the derived group. Thus, a new rule to detect composite vulnerabilities can be generated based on a given rule o grouping of reference vulnerabilities. For example, if a specified rule/grouping reference vulnerabilities is SUBTYPE_A_x+SUBTYPE_B_y+SUBTYPE_C_z+SUBTYPE_D_w, another rule derived via machine learning can be SUBTYPE_A_x+SUBTYPE_B_p+SUBTYPE_C_q+SUBTYPE_D_w, where SUBTYPE_B_p is related to SUBTYPE_B_y and SUBTYPE_C_q is related to SUBTYPE_C_z.

In some embodiments, the method includes obtaining the set of detected vulnerabilities via static and/or dynamic source code analysis. The method may include obtaining the set of detected vulnerabilities via static and/or dynamic binary code analysis, which may be performed with or without access to source code corresponding to the binary code.

In another aspect, a computer system includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to determine whether a composite security vulnerability based on a number of other vulnerabilities exists in a code. To this end, the instructions program the processing unit to: (a) classify a set of detected vulnerabilities associated with a code into a number of different classes, and (b) perform a first test to determine whether a first class includes a first individual vulnerability matching a first reference vulnerability in a specified group. The instructions also program the processing unit to: (c) performing a second test to determine whether a second class (different from the first class) includes a second individual vulnerability matching a second, different reference vulnerability in the specified group. In addition, the instructions program the processing unit to: (d) identify, based at least on results of the first and second tests, a composite security vulnerability that is based on the first and second individual vulnerabilities. In various embodiments, the instructions can program the processing unit to perform one or more of the method steps described above.

In another aspect, an article of manufacture that includes a non-transitory storage medium has stored therein instructions which, when executed by a processor program the processor, which is in electronic communication with a memory, to determine whether a composite security vulnerability based on a number of other vulnerabilities exists in a code. To this end, the instructions program the processor to: (a) classify a set of detected vulnerabilities associated with a code into a number of different classes, and (b) perform a first test to determine whether a first class includes a first individual vulnerability matching a first reference vulnerability in a specified group. The instructions also program the processor to: (c) performing a second test to determine whether a second class (different from the first class) includes a second individual vulnerability matching a second, different reference vulnerability in the specified group. In addition, the instructions program the processor to: (d) identify, based at least on results of the first and second tests, a composite security vulnerability that is based on the first and second individual vulnerabilities. In various embodiments, the stored instructions can program the processor to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION

Figure 1:
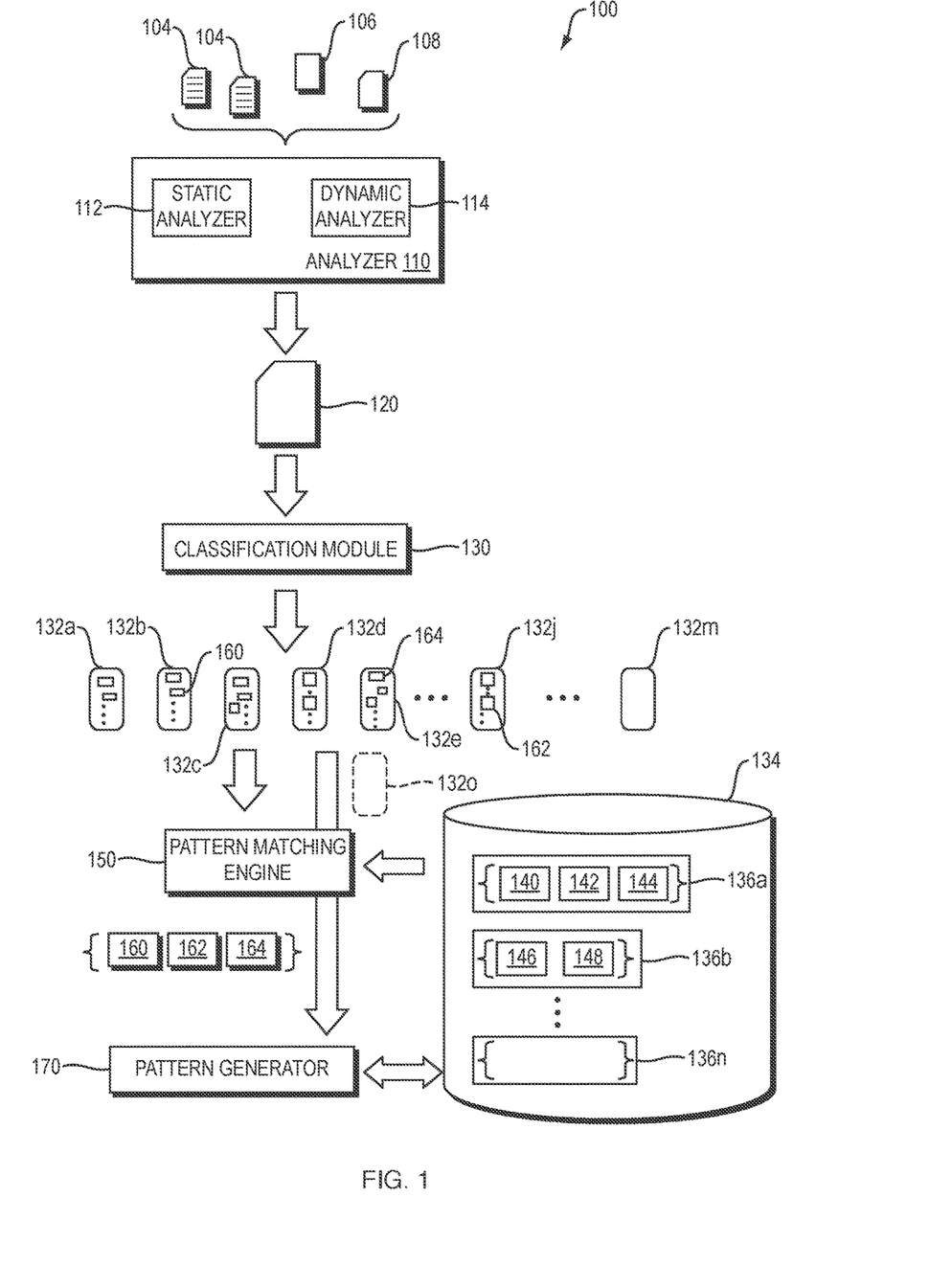
FIG. 1. schematically depicts a system for identifying composite vulnerabilities, according to one embodiment.

With reference to FIG. 1, in a vulnerability analysis system 100, a software system/program 102 in which vulnerabilities are to be detected is analyzed by an analyzer 110. The software 102 may include one or more source files 104, one or more binaries 106, and/or other files 108, such as script files. The analyzer 110 may include a static analyzer 112 and/or a dynamic analyzer 114. The analyzer 110 may produce a list of defects/vulnerabilities 120. The defect/vulnerability list may include a type of a vulnerability. In some embodiments, the vulnerability type is described as a common weakness enumeration (CWE) identifier. Types or classes of defects/vulnerabilities need not be expressed using CWE or CWE alone. For example, defect/vulnerability types or classes may be expressed using one or more of SANS software security and classification of defects, provided by the SysAdmin, Audit, Network, Security (SANS) Institute, IEEE standard classification of software defects, Open Web Application Security Project (OWASP) classification of defects, CWE, and/or other defect taxonomies. The defect/vulnerability list 120 may also include for each identified vulnerability additional information such as the source file and/or binary in which that particular vulnerability was found, location identifiers, such as line numbers, a class or a method in which the detect/vulnerability was found, etc. In some embodiments, the additional information associated with a defect/vulnerability includes an identifier of the developer and/or a development unit that wrote the code portion (e.g., the file, class, method, etc.) in which the defect/vulnerability was detected.

A classification module 130 may classify or cluster the identified vulnerabilities in the list 120 into several clusters 132a, 132b, . . . , 132m, etc. Each cluster may be associated with a different class of vulnerabilities. Each vulnerability class may include one or more types or subtypes of defects/vulnerabilities. The different classes of defects/vulnerabilities are described further below. The number of clusters can be any number, e.g., 2, 3, 4, 7, 10, etc., and may be specified by a user. A database 134 includes one or more patterns 136a, 136b, . . . , 136n, where each pattern represents a composite vulnerability. Each pattern includes two or more different types of vulnerabilities. For example, the pattern 136a includes three vulnerabilities of types 140, 142, and 144. The pattern 136b includes two vulnerabilities of types 146 and 148.

A pattern matching engine 150 identifies within the clusters 132a through 132m patterns of defects/vulnerabilities that match one or more patterns 136a through 136n in the database 134. A pattern-matching process is described using the pattern 136, as an example. As described above, the pattern 136 includes three types of vulnerabilities, namely, 140, 142, and 144. The pattern matching engine 150 determines the class of the defect/vulnerability type 140 to be 132b. The engine 150 then searches the cluster 132b to check if a defect/vulnerability of type 140 can be detected. In one example, such a vulnerability 160 was detected.

This process is repeated for the other two types of vulnerabilities, i.e., 142 and 144, in the pattern 136a. If vulnerabilities matching the pattern 136a are detected across the different clusters 132a through 132m, the composite vulnerability associated with the pattern 136a is then determined to exist. In the foregoing example, the class of the vulnerability of type 142 was 132j, and a vulnerability 162 of the type 142 was detected in the cluster 132j. Similarly, the class of the vulnerability of type 144 was 132e, and a vulnerability 164 of the type 144 was detected in the cluster 132e. The software 102 is thus determined to have a composite vulnerability associated with the pattern 136a.

In some embodiments, the authors of the respective modules (e.g., files, classes, functions, etc.) in which the vulnerabilities 160, 162, 164 were detected are identified. The analyzer 110 can provide this information, in some embodiments. If the author/developer of all of these modules is the same, there is a high likelihood that that developer purposefully introduced these individual vulnerabilities, so that the corresponding composite vulnerability may be exploited. In some cases, a particular group of developers may be associated with the individual vulnerabilities corresponding to a composite vulnerability. If the same group of developers is determined to be associated with defects/vulnerabilities matching several patterns, there is an increased likelihood that such a group purposefully introduced these defects/vulnerabilities in the code. Regardless of whether a single individual or a single group is associated with the individual vulnerabilities corresponding to a pattern, the fact that a certain pattern of defects/vulnerabilities (e.g., the pattern 136a) exists in the code suggests an increased likelihood that the code can be exploited for malicious purposes. Therefore, these individual vulnerabilities may be investigated further and/or remedied, even if they do not appear to be significant when taken in isolation.

While analyzing the pattern 136b, which includes two vulnerabilities of types 146 and 148, the pattern-matching engine 150 may determine that the class associated with the vulnerability type 146 is 132a and the class associated with the vulnerability type 148 is 132d. If the class/cluster 132d does not include any defect/vulnerability of the type 148, the pattern-matching engine may determine that a vulnerability corresponding to the pattern 136b does not exist in the software 102. It is also possible that the class associated with the vulnerability type 148 is not 132d and, instead, is 132o. If the clustering did not identifying any defects/vulnerabilities in the software 102 that belong to the class/cluster 132o, i.e., the cluster 132o was not generated during clustering, the pattern-matching engine 150 may determine that a vulnerability corresponding to the pattern 136b does not exist in the software 102. In this case, a search in the class/cluster 132 to find a defect/vulnerability of type 146 can be skipped. In various embodiments, the determination of one or more composite vulnerabilities does not require additional detection of defects/vulnerabilities beyond those already detected via static and/or dynamic analysis of the code.

In some instances, an insider may introduce a composite vulnerability based on the processes of data exfiltration that includes: (1) triggering of an event; (2) data communication; and (3) covering tracks. As such, in some embodiments, three different classes of defects/vulnerabilities can be: (i) event-triggering defects/vulnerabilities, (ii) defects/vulnerabilities permitting data access, and (iii) defects/vulnerabilities that make detection of defects/vulnerabilities difficult. It should be understood that the process described above, though likely to identify many insider security threats, is not the only process that can be contemplated. For example, a process relating to malicious destruction and/or alteration of data may include privilege escalation, execution-after-redirect, and modification of data. Examples of classes or types of defects/vulnerabilities related to privilege escalation can be CWE 79, or improper neutralization of input during web page generation. If the web page is served to another user, the software may be vulnerable to a cross-site scripting (XSS) attack. This vulnerability in combination with a vulnerability associated with improper privilege management (e.g., CWE 269) can cause privilege escalation or improper grant of privilege to an unauthorized user. This in combination with vulnerabilities of a type/class that permit execution after redirect (e.g., CWE 698) and/or vulnerabilities of a type/class that permit modifying and/or deleting data (e.g. CWE 89, also known as SQL injection) can allow an unauthorized user to gain access to a software system, execute malicious code and destroy or alter data. Each of these types of defects/vulnerabilities, taken individually, may not be deemed significant, however.

Another process relates to software defacement in which a web page or a web site is changed by an unauthorized user. In a defacement process, the classes/types of vulnerabilities involved may include hardcoded credentials (e.g., CWE 798), which typically create a significant hole that allows an attacker to bypass the authentication that has been configured by the software administrator, and/or missing authorization for critical function (e.g., CWE 306). The defacement process may also include a class/type of defects such as weak cryptographic keys (e.g., CWE 338), inadequate cryptographic strength (e.g. CWE 326), and/or insufficient compartmentalization (e.g., CWE 653), where the software does not sufficiently compartmentalize functionality or processes that require different privilege levels, rights, or permissions. Here again, each weakness, considered individually may not be deemed significant. In combination, however, an attacker to exploit a weakness in a low-privilege-level module to cause damage in a high-privilege-level module, to cause an unauthorized change to the software or any output produced by the software. As such, different embodiments may include only two or more than three, e.g., 4, 6, 7, etc., classes of defects/vulnerabilities, and different combinations may identify composite vulnerabilities that may permit different kinds of attacks.

Each of the classes described above may include different types of defects/vulnerabilities. For example, a triggering event can be caused by a Logic/time-based trigger, i.e., a certain method, sub-process, etc. may be invoked when a certain condition becomes TRUE or FALSE, and/or when certain time-based event occurs. A date and/or time based comparison may result in a logic-based trigger. A process flow disruption used outside of normal operations/data recovery may also indicate an event trigger. Credential insertion into database can serve as a trigger that subsequently permits overwriting of input parameters into the database and/or insertion of false credentials into the database. Other examples of defect/vulnerability types that can trigger an event include password bypassing, e.g., via a comparison with null or hardcoded string, comparisons involving obfuscated code, alternate-encoded strings, hardcoded strings etc.

Once a certain trigger event occurs, e.g., a certain logic condition is met on a particular day and/or at a particular time of the day, defects/flaws involving data communication may allow unauthorized access to data. Such defects/vulnerabilities may involve exfiltration and/or deletion, corruption, and/or overwriting of software data. Examples of types of vulnerabilities belonging to the class of communication-related defects include the use of telnet, secure shell (SSH), or socket-based communication in a web application, which typically does not use any of these communication techniques.

Often, an insider may attempt to cover tracks to avoid detection of the purposefully introduced defects that belong to the classes such as event triggers and data communication. A static or dynamic analyzer may recognize the attempts to cover tracks as defects/vulnerabilities themselves, belonging to their own class. This class may include defects/vulnerabilities of types code obfuscation, hidden functionality, e.g., a difference between time of check and time of use (generally known as TOCTOU), duplicate/redundant checks, and increased code complexity in combination with TOCTOU. Other types of defects/vulnerabilities in this class may include log forging, class loader abuse, custom class loaders, and method overriding.

Figure 2:
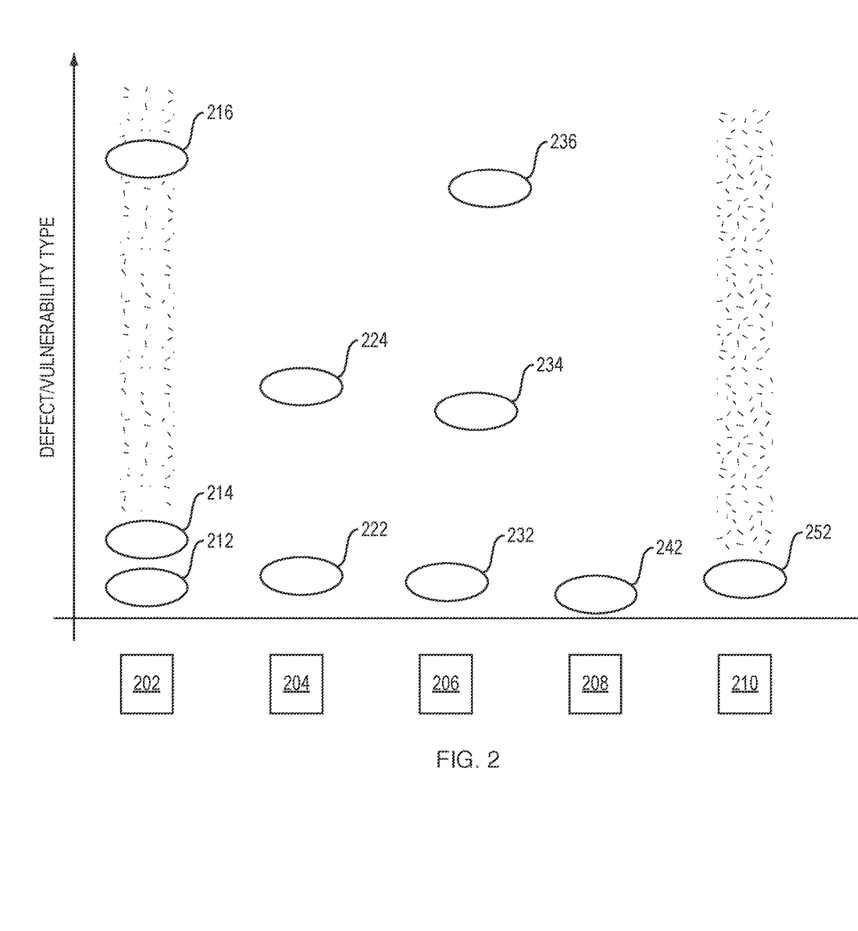
FIG. 2 schematically depicts clustering of defects/vulnerabilities, according to one example.

With reference to FIG. 2, clustering of the defects in several software modules 202 through 210 can be performed. These software modules may be related to a single software system/application or may relate to different software systems/apps. In one example, the modules 202 and 210 include defects/vulnerabilities of many different types. Some of the defects of the module 202 are classified into clusters 212, 214, and 216, and some of the defects of the module 210 are classified into a cluster 252. Many other defects of the module 202 are not classified into other clusters and, similarly, many defects of the module 210 are also not classified into additional clusters. On the other hand, the defects/vulnerabilities in the module 204 are classified into clusters 222 and 224. The defects/vulnerabilities in the module 206 are classified into clusters 232, 234, and 236, and the defects/vulnerabilities in the module 208 are classified into a cluster 242. It should be understood that the number of modules depicted in FIG. 2 is illustrative only and that in general any number (e.g., 2, 3, 7, 10, 100, 130, 500, 1200, etc.) of modules can be analyzed. The number of clusters associated with any particular module can also be any number such as 1, 2, 4, 5, 10, 12, 30, etc.

Using the module 206 as an example, if a particular pattern of defects/vulnerabilities that includes one defect/vulnerability each from the clusters 232, 234, 236 is detected, in some embodiments, the fact that the clusters 232, 234, 236 include several additional defects/vulnerabilities can be used to generate and explore new patterns. For example, a pattern {CWE 66 (improper or virtual resource)+ CWE 114 (process control)+CWE 88 (argument injection)+

CWE 90 (improper implementation of light-weight directory access protocol (LDAP))} may be found in the module 206, where CWE66 belongs to the cluster 232, CWE114 belongs to the cluster 234, and CWE88 and CWE90 belong to the cluster 236. The cluster 232 may include a defect of another type, namely CWE 514 (covert channel). The cluster 234 may include defect of another type CWE 642 (external control of state data), and the cluster 236 may include a defect CWE 652 (xpath injection). The pattern {CWE 514 (covert channel)+CWE 642 (external control of state data)+ CWE 652 (xpath injection)} may indicate yet another composite vulnerability.

In some embodiments, a pattern generator 170 depicted in FIG. 1 may identify one or more such additional patterns if a match for a specified pattern is found. These additional patterns may represent additional composite vulnerabilities that may be present in the software code. A machine learning process may be employed in some embodiments to derive such additional patterns. For example, untrained learning can be used to identify new combinations of classes/types of defects representing composite vulnerabilities. Alternatively, or in addition, trained learning may be used to identify new combinations of classes/types of defects representing composite vulnerabilities. The training can be based on composite vulnerabilities such as data exfiltration, destruction/modification, and/or defacement, for which the combinations of defect/vulnerability classes are known and/or determined previously.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for determining whether a composite security vulnerability based on a plurality of vulnerabilities exists in a code, the method comprising performing by a processor the steps of:
    (a) classifying a set of detected vulnerabilities associated with a code into a plurality of classes;
    (b) selecting a vulnerability pattern comprising at least a first reference vulnerability and a second reference vulnerability;
    (c) performing a first test to determine whether a first class comprises a first individual vulnerability matching the first reference vulnerability;
    (d) performing a second test to determine whether a second class comprises a second individual vulnerability matching the second reference vulnerability; and
    (e) identifying, based at least on results of the first and second tests, a composite security vulnerability that corresponds to the selected vulnerability pattern and that is based on the first and second individual vulnerabilities.

2. The method of claim 1, wherein at least one of the first and second reference vulnerabilities is represented using a format selected from the group consisting of common weakness enumeration (CWE), SysAdmin, Audit, Network, Security (SANS) Institute software security and classification, Institute of Electrical and Electronics Engineers (IEEE) standard classification of software defects, and Open Web Application Security Project (OWASP) classification of defects.

3. The method of claim 1, wherein identifying the composite security vulnerability comprises determining that a code-development unit associated with the first individual vulnerability is also associated with the second individual vulnerability.

4. The method of claim 1, wherein:
    each vulnerability designated to the first class comprises a vulnerability related to an event trigger; and
    each vulnerability designated to the second class comprises a vulnerability that is not related to an event trigger.

5. The method of claim 4, wherein:
    the first reference vulnerability comprises at least one of:
        a vulnerability comprising a logic trigger based on a time comparison;
        a vulnerability causing process flow disruption in the flow; and
        a vulnerability allowing bypassing a password check.

6. The method of claim 1, wherein:
    each vulnerability designated to the first class comprises a vulnerability related to data communication; and
    each vulnerability designated to the second class comprises a vulnerability that is not related to data communication.

7. The method of claim 6, wherein the vulnerability related to data communication comprises at least one of a data exfiltration vulnerability and a data injection vulnerability.

8. The method of claim 6, wherein:
    the first reference vulnerability comprises at least one of:
        a vulnerability allowing credential insertion; and
        a vulnerability allowing creation of a communication channel based on of at least one of: (i) a telnet; (ii) a secure shell, and (iii) a socket.

9. The method of claim 1, wherein:
    each vulnerability designated to the first class comprises a vulnerability related to code obfuscation; and
    each vulnerability designated to the second class comprises a vulnerability that is not related to code obfuscation.

10. The method of claim 9, wherein:
    the first reference vulnerability comprises at least one of:
        a vulnerability comprising a plurality of string encodings;
        a vulnerability based on a difference between a time of check and a time of use;
        a vulnerability comprising at least one redundant check;
        a vulnerability comprising log forging; and
        a vulnerability comprising method overriding.

11. The method of claim 1, further comprising:
    performing a third test to determine whether a third class comprises a third individual vulnerability matching a third reference vulnerability in the selected pattern,
    wherein identifying the composite security vulnerability that corresponds to the selected pattern and that is based on the first and second individual vulnerabilities comprises identifying a composite security vulnerability that is also based on the third individual vulnerability.

12. The method of claim 11, wherein:
    each vulnerability designated to the first class comprises a vulnerability related to a first type;
    each vulnerability designated to the second class comprises a vulnerability related to a second type that is different from the first type;
    each vulnerability designated to the third class comprises a vulnerability related to a third type that is different from both the first type and the second type; and
    each of the first, second, and third types comprises one of: (i) an event trigger; (ii) data communication; and (iii) code obfuscation.

13. The method of claim 1, further comprising:
    employing machine learning to generate a derived group by:
        identifying at least one of: (i) a derived first reference vulnerability corresponding to the first reference vulnerability, and (ii) a derived second reference vulnerability corresponding to the second reference vulnerability; and
        including at least one of the derived first reference vulnerability and the derived second reference vulnerability in the derived group; and
    performing steps (b)-(e) using the derived group.

14. The method of claim 1, further comprising obtaining the set of detected vulnerabilities via at least one of static and dynamic source code analysis.

15. The method of claim 1, further comprising obtaining the set of detected vulnerabilities via at least one of static and dynamic binary code analysis without access to source code corresponding to the binary code.

16. A system for determining whether a composite security vulnerability based on a plurality of vulnerabilities exists in a code, the system comprising:
a first processor; and
a first memory in communication with the first processor, the first memory comprising instructions which, when executed by a processing unit comprising at least one of the first processor and a second processor, the processing unit being in communication with a memory module comprising at least one of the first memory and a second memory, program the processing unit to:
(a) classify a set of detected vulnerabilities associated with a code into a plurality of classes;
(b) select a vulnerability pattern comprising at least a first reference vulnerability and a second reference vulnerability;
(c) perform a first test to determine whether a first class comprises a first individual vulnerability matching the first reference vulnerability;
(d) perform a second test to determine whether a second class comprises a second individual vulnerability matching the second reference vulnerability; and
(e) identify, based at least on results of the first and second tests, a composite security vulnerability that corresponds to the selected vulnerability pattern and that is based on the first and second individual vulnerabilities.

17. The system of claim 16, wherein at least one of the first and second reference vulnerabilities is represented using a format selected from the group consisting of common weakness enumeration (CWE), SysAdmin, Audit, Network, Security (SANS) Institute software security and classification, Institute of Electrical and Electronics Engineers (IEEE) standard classification of software defects, and Open Web Application Security Project (OWASP) classification of defects.

18. The system of claim 16, wherein to identify the composite security vulnerability, the instructions program the processing unit to determine whether a code-development unit associated with the first individual vulnerability is also associated with the second individual vulnerability.

19. The system of claim 16, wherein:
each vulnerability designated to the first class comprises a vulnerability related to an event trigger; and
each vulnerability designated to the second class comprises a vulnerability that is not related to an event trigger.

20. The system of claim 19, wherein:
the first reference vulnerability comprises at least one of:
a vulnerability comprising a logic trigger based on a time comparison;
a vulnerability causing process flow disruption in the flow; and
a vulnerability allowing bypassing a password check.

21. The system of claim 16, wherein:
each vulnerability designated to the first class comprises a vulnerability related to data communication; and
each vulnerability designated to the second class comprises a vulnerability that is not related to data communication.

22. The system of claim 21, wherein the vulnerability related to data communication comprises at least one of a data exfiltration vulnerability and a data injection vulnerability.

23. The system of claim 21, wherein:
the first reference vulnerability comprises at least one of:
a vulnerability allowing credential insertion; and
a vulnerability allowing creation of a communication channel based on of at least one of: (i) a telnet; (ii) a secure shell, and (iii) a socket.

24. The system of claim 16, wherein:
each vulnerability designated to the first class comprises a vulnerability related to code obfuscation; and
each vulnerability designated to the second class comprises a vulnerability that is not related to code obfuscation.

25. The system of claim 24, wherein:
the first reference vulnerability comprises at least one of:
a vulnerability comprising a plurality of string encodings;
a vulnerability based on a difference between a time of check and a time of use;
a vulnerability comprising at least one redundant check;
a vulnerability comprising log forging; and
a vulnerability comprising method overriding.

26. The system of claim 16, wherein the instructions further program the processing unit to:
perform a third test to determine whether a third class comprises a third individual vulnerability matching a third reference vulnerability in the selected pattern,
wherein to identify the composite security vulnerability that corresponds to the selected vulnerability pattern and that is based on the first and second individual vulnerabilities, the instructions program the processing unit to identify a composite security vulnerability that is also based on the third individual vulnerability.

27. The system of claim 26, wherein:
each vulnerability designated to the first class comprises a vulnerability related to a first type;
each vulnerability designated to the second class comprises a vulnerability related to a second type that is different from the first type;
each vulnerability designated to the third class comprises a vulnerability related to a third type that is different from both the first type and the second type; and
each of the first, second, and third types comprises one of: (i) an event trigger; (ii) data communication; and (iii) code obfuscation.

28. The system of claim 16, wherein the instructions further program the processing unit to:
employ machine learning for generating a derived group by programming the processing unit to:
identify at least one of: (i) a derived first reference vulnerability corresponding to the first reference vulnerability, and (ii) a derived second reference vulnerability corresponding to the second reference vulnerability; and
include at least one of the derived first reference vulnerability and the derived second reference vulnerability in the derived group; and
perform operations (b)-(e) using the derived group.

29. The system of claim 16, wherein the instructions further program the processing unit to perform at least one of static and dynamic source code analysis, for obtaining the set of detected vulnerabilities.

30. The system of claim 16, wherein the instructions further program the processing unit to perform at least one of static and dynamic binary code analysis, without access to source code corresponding to the binary code, for obtaining the set of detected vulnerabilities.

\* \* \* \* \*